United States Patent
Domsch et al.

(10) Patent No.: US 12,032,664 B2
(45) Date of Patent: *Jul. 9, 2024

(54) SYSTEMS AND METHODS FOR NETWORK SECURITY USING IDENTITY MANAGEMENT DATA

(71) Applicant: SailPoint Technologies, Inc., Wilmington, DE (US)

(72) Inventors: Matthew Lee Domsch, Austin, TX (US); Rohit Gupta, Pittsford, NY (US)

(73) Assignee: SAILPOINT TECHNOLOGIES, INC., Wilmington, DE (US)

( * ) Notice: Subject to any disclaimer, the term of this patent is extended or adjusted under 35 U.S.C. 154(b) by 180 days.

This patent is subject to a terminal disclaimer.

(21) Appl. No.: 17/698,178

(22) Filed: Mar. 18, 2022

(65) Prior Publication Data
US 2022/0300586 A1    Sep. 22, 2022

Related U.S. Application Data

(63) Continuation of application No. 17/206,424, filed on Mar. 19, 2021, now Pat. No. 11,308,186.

(51) Int. Cl.
*G06F 21/31* (2013.01)
*G06F 21/62* (2013.01)
*G06N 20/00* (2019.01)

(52) U.S. Cl.
CPC .......... *G06F 21/31* (2013.01); *G06F 21/6218* (2013.01); *G06N 20/00* (2019.01)

(58) Field of Classification Search
CPC ...... G06F 21/31; G06F 21/6218; G06N 20/00
See application file for complete search history.

(56) References Cited

U.S. PATENT DOCUMENTS

| | | | |
|---|---|---|---|
| 10,531,295 B2 * | 1/2020 | McClement | H04W 12/06 |
| 10,643,135 B2 | 5/2020 | Farrell | |
| 10,942,991 B1 * | 3/2021 | Kidd | G06F 16/9574 |
| 11,461,677 B2 | 10/2022 | Badawy | |
| 11,636,213 B1 * | 4/2023 | Elgressy | H04L 63/0263 726/25 |
| 2011/0185055 A1 * | 7/2011 | Nappier | H04L 63/08 709/224 |
| 2012/0324547 A1 * | 12/2012 | Vidal | H04L 63/083 726/4 |
| 2016/0352860 A1 * | 12/2016 | Deb | H04L 67/306 |
| 2017/0195415 A1 | 7/2017 | Versteeg | |
| 2018/0025064 A1 | 1/2018 | Atlas | |
| 2018/0075104 A1 | 3/2018 | Oberbreckling | |
| 2019/0007894 A1 * | 1/2019 | Subramanian | H04W 64/00 |
| 2019/0164173 A1 * | 5/2019 | Liu | G06N 20/00 |
| 2019/0260733 A1 | 8/2019 | Koranda | |

(Continued)

OTHER PUBLICATIONS

NPL Search Terms (Year: 2023).*

(Continued)

*Primary Examiner* — Syed A Zaidi
(74) *Attorney, Agent, or Firm* — Sprinkle IP Law Group (57) ABSTRACT

Systems and methods for embodiments of artificial intelligence systems for identity management are disclosed. Embodiments of the identity management systems disclosed herein may support the correlation of identities determined authoritative source systems with uncorrelated accounts within an enterprise using artificial intelligence techniques.

21 Claims, 3 Drawing Sheets

(56) References Cited

U.S. PATENT DOCUMENTS

| | | | |
|---|---|---|---|
| 2020/0007554 A1* | 1/2020 | Vincent | G06F 21/31 |
| 2020/0050966 A1 | 2/2020 | Enuka | |
| 2021/0112065 A1 | 4/2021 | Yang | |
| 2021/0342785 A1* | 11/2021 | Mann | H04L 51/48 |
| 2021/0349988 A1* | 11/2021 | Lobban | G06F 21/6254 |
| 2021/0374831 A1* | 12/2021 | Hudson | G06N 5/04 |
| 2022/0391726 A1 | 12/2022 | Badawy | |

OTHER PUBLICATIONS

NPL Search Terms (Year: 2024).*

Office Action for U.S. Appl. No. 17/891,639, mailed Mar. 2, 2023, 15 pgs.

Office Action for U.S. Appl. No. 16/814,291, mailed May 11, 2022, 15 pgs.

Notice of Allowance for U.S. Appl. No. 16/814,291 mailed Aug. 3, 2022, 17 pgs.

Office Action for U.S. Appl. No. 17/891,639, mailed Aug. 23, 2023, 10 pgs.

Notice of Allowance for U.S. Appl. No. 17/891,639, mailed Feb. 29, 2024, 7 pgs.

Notice of Allowance for U.S. Appl. No. 17/891,639, mailed Dec. 14, 2023, 8 pgs.

* cited by examiner

SYSTEMS AND METHODS FOR NETWORK SECURITY USING IDENTITY MANAGEMENT DATA

RELATED APPLICATION(S)

This application is a continuation of, and claims a benefit of priority under 35 U.S.C. 120 of, U.S. patent application Ser. No. 17/206,424 filed Mar. 19, 2021, issued as U.S. Pat. No. 11,308,186, entitled "SYSTEMS AND METHODS FOR DATA CORRELATION AND ARTIFACT MATCHING IN IDENTITY MANAGEMENT ARTIFICIAL INTELLIGENCE SYSTEMS," which is hereby incorporated herein for all purposes.

TECHNICAL FIELD

This disclosure relates generally to computer security, including identity management in a distributed and networked computing environment. In particular, this disclosure relates to enhancing computer security in a distributed networked computing environment through the use of improved data correlation and entity matching in these artificial intelligence identity management systems. Even more specifically, this disclosure relates to the application of analysis of identity management data for targeted crowdsourcing for artificial intelligence identity management systems to apply data correlation and artifact matching to data from source systems.

BACKGROUND

Acts of fraud, data tampering, privacy breaches, theft of intellectual property, and exposure of trade secrets have become front page news in today's business world. The security access risk posed by insiders—persons who are granted access to information assets—is growing in magnitude, with the power to damage brand reputation, lower profits, and erode market capitalization.

Identity Management (IM), also known as Identity and Access Management (IAM) or Identity Governance (IG), is, the field of computer security concerned with the enablement and enforcement of policies and measures which allow and ensure that the right individuals access the right resources at the right times and for the right reasons. It addresses the need to ensure appropriate access to resources across increasingly heterogeneous technology environments and to meet increasingly rigorous compliance requirements. Escalating security and privacy concerns are driving governance, access risk management, and compliance to the forefront of identity management. To effectively meet the requirements and desires imposed upon enterprises for identity management, these enterprises may be required to prove that they have strong and consistent controls over who has access to critical applications and data. And, in response to regulatory requirements and the growing security access risk, most enterprises have implemented some form of user access or identity governance.

Yet many companies still struggle with how to focus compliance efforts to address actual risk in what usually is a complex, distributed networked computing environment. Decisions about which access entitlements are desirable to grant a particular user are typically based on the roles that the user plays within the organization. In large organizations, granting and maintaining user access entitlements is a difficult and complex process, involving decisions regarding whether to grant entitlements to thousands of users and hundreds of different applications and databases. This complexity can be exacerbated by high employee turnover, reorganizations, and reconfigurations of the various accessible systems and resources.

Organizations that are unable to focus their identity compliance efforts on areas of greatest access risk can waste time, labor, and other resources applying compliance monitoring and controls across the board to all users and all applications. Furthermore, with no means to establish a baseline measurement of identity compliance, organizations have no way to quantify improvements over time and demonstrate that their identity controls are working and effectively reducing access risk.

Information Technology (IT) personnel of large organizations often feel that their greatest security risks stemmed from "insider threats," as opposed to external attacks. The access risks posed by insiders range from careless negligence to more serious cases of financial fraud, corporate espionage, or malicious sabotage of systems and data. Organizations that fail to proactively manage user access can face regulatory fines, litigation penalties, public relations fees, loss of customer trust, and ultimately lost revenue and lower stock valuation. To minimize the security risk posed by insiders (and outsiders), business entities and institutions alike often establish access or other governance policies that eliminate or at least reduce such access risks and implement proactive oversight and management of user access entitlements to ensure compliance with defined policies and other good practices.

One of the main goals of IM, then, is to help users identify and mitigate risks associated with access management. As IM is the discipline that ensures compliance with defined policies by aggregating, visualizing, and managing users and their access, implementations of IM systems may enable the automation of certain process within enterprises of organizations, including for example, provisioning, certifications, access reviews, and Separation of Duties (SOD) processes. Typical identity and access information available from IM solutions may utilize simple context to inform certain decision making processes, however additional, more complex and specific, context may be desirable from a variety of perspectives, including managers, owners, IT or security/regulatory departments, or others. Without such complex contextual data information management systems may suffer from low workflow efficiency and lower security.

However, even such proactive oversight may do little to ease the burden of compliance with regulatory requirements or the assessment of access requests for users in the enterprise environment. These burdens may be a microcosm of a larger issue with typical identity management systems. Namely, the sheer volume of such identity management data combined with the current manner in which identity management systems store and access such data prevents these types of identity management systems from effectively dealing with the volume of such data, which, in turn, prevents this identity management data from being effectively evaluated or even understood.

One particular facet of these problems pertains to the ingestion of data from source systems within an organization. It is axiomatic that to manage, aggregate, or visualize users and their accesses along with other pertinent IM data, it is first necessary to determine what the identity management artifacts pertinent to the organization are. Given the volume of data within an enterprise that may be obtained to determine IM data on identities, entitlements, roles, groups, or other identity management artifacts, and the typically large number of source systems from which the data may be obtained, correlating or processing this data to make canonical determinations about identities or other artifacts and more generally, associate such data pertaining to like artifacts may be extremely difficult.

What is desired therefore, are effective systems and methods for correlating or matching data about identity management artifacts, including matching or correlating of such data to various identities.

SUMMARY

As mentioned, the sheer volume of identity management data in identity management systems combined with the current manner in which identity management systems store and access such data prevents these types of identity management systems from effectively dealing with the volume of such data, which, in turn, prevents this identity management data from being effectively evaluated or even understood.

Specifically, in most cases, identity management systems obtain data on identity management artifacts from various touchpoint (or source) systems within an enterprise environment. The obtained data is then processed to determine identity management artifacts (or updates to identity management artifacts) to be stored and maintained at the identity management system to facilitate identity governance with respect to the enterprise. This process is sometimes referred to as data ingestion or the data ingestion stage.

This data ingestion stage therefore usually determines and associates identity management artifacts (e.g., identities, entitlements, accounts, etc.) in a manner that facilitates identity governance of those artifact. This ingestion stage is, however, quite complex. There is usually a large amount of data that is collected from different source systems that pertains to the same identity management artifact. For example, with respect to identities, during a data ingestion stage, tens, or hundreds, of thousands (or more) accounts may be harvested from different source systems across an enterprise. Some of these accounts may pertain to the same user, or more generally to the same identity. Thus, to establish an identity at the identity management system, where that identity may be a canonical identity management artifact for that identity it may be desired to correlate or match (used interchangeably herein) the various accounts from across source systems to determine which accounts should be associated with the same identity. In particular, when ingesting accounts from a particular source system, it is desirable to correlate those accounts with a corresponding identity.

To facilitate this correlation, the source systems may be designated as, or determined to be, authoritative source systems and non-authoritative systems. Accounts from these authoritative source systems are designated to contain direct, identity-specific information that makes it possible to establish a comprehensive list of the identities within the enterprise. The challenging problem then is to accurately correlate the other, non-authoritative accounts (e.g., from other source systems), with the corresponding identities. Typically, the correlation stage requires a substantial amount of resources and can take months to finalize, prolonging deployment and delaying any benefits of employing identity management systems.

To associate accounts, typically what is done is to rely on human observations to identify commonalities between account and identity data. These observations are then translated into multiple regular expression search queries to generate hard-coded rules scripts that process data from the source system and establish the desired correlations. In many cases, these searches must be performed across every pair of accounts determined from the source systems, resulting in process that may be of polynomial or even exponential order. Moreover, these processes may be repetitive and may not function as designed, as the data retrieved from these source systems may not always conform to a particular schema, or may be sparse in certain instances. These processes are thus mundane and slow, may take several months to finish, and consume quite a bit of valuable resources.

It would thus be desirable to provide identity management systems and methods for their operation that can accurately correlate accounts from source systems to identities in a performant, accurate, and scalable manner.

To those ends, among others, embodiments as disclosed herein provide systems and methods for identity management systems which correlate accounts from source systems with one another using crowdsourcing. Crowdsourcing in this context may include obtaining data on the correlation of an account to an identity by eliciting the input of one or more users associated with the enterprise through network based communications. Specifically, embodiments may be adapted to accurately determine to whom such crowdsourcing requests should be sent for each individual account (a crowdsourcing target for that account). These embodiments may thus serve to refine crowdsourcing targets for crowdsourcing information about uncorrelated accounts based on previously determined knowledge from that same enterprise, including identity management artifacts previously determined or associated with respect to that enterprise. By accurately scoping or targeting the universe of users within the enterprise to whom the crowdsourcing requests for accounts may be sent (in some cases to a single user), the potential burden on the users of the enterprise may be reduced while substantially increasing the likelihood of generating a response to such crowdsourcing requests and simultaneously improving the data obtained from those responses.

In one embodiment, an identity management system can obtain identity management data associated with a plurality of source systems in a distributed enterprise computing environment. These source systems may for example, comprise a system or platform implementing an application utilized by users of the enterprise environment. This identity management data can include data on a set of identity management artifacts utilized in identity management in the distributed enterprise computing environment, wherein the plurality of source systems include a non-authoritative source system and an authoritative source system and the identity management data comprises account data on accounts from the non-authoritative source system and identity data on identities from the authoritative source system. These accounts may include entitlements associated with access rights to the application implemented by the source system.

Generally then, when accounts are received from a source system within the enterprise, there may be a set of correlated accounts (e.g., accounts which were previously correlated with identities or for which such an association can be made) and a set of uncorrelated accounts (e.g., accounts which have not yet been associated with any identity). Embodiments may be adapted to determine identities within the enterprise to whom crowdsourcing requests should be sent based on the uncorrelated accounts. Such a determination may leverage the correlated accounts from the source system by finding correlated accounts that are associated with the uncorrelated accounts and using these associated correlated accounts to determine the identities to whom the request for crowdsourcing should be sent. According to one embodiment in particular, when a correlated account is associated with an uncorrelated account, the identity associated with the correlated account (e.g., the identity correlated with that account) can be determined from the identity management data of the identity management system. This identity may be used as a crowdsourcing target. Additionally, using the identity management data at the identity management system, an identity of a manager or other superior or supervisor or person higher in a hierarchy associated with the enterprise (which will be collectively referred to as a manager herein without loss of generality) of the identity associated with that correlated account may be determined and utilized as a crowdsourcing target.

For a given uncorrelated account, the determination of these peer correlated accounts for the uncorrelated account of interest (e.g., correlated accounts associated with that uncorrelated account) may be determined by comparing the uncorrelated account of interest to the correlated accounts from the source system to determine the set of peer correlated accounts. Specifically, in one embodiment a similarity metric (e.g., a value or weight representing a similarity) may be determined between the uncorrelated account and each of the set of correlated accounts. Each of these accounts obtained from the source system may be associated with one or more entitlements (e.g., the ability to perform or access a function associated with the source system). Accordingly, such a similarity metric may be based on the number of entitlements shared between the accounts being compared (e.g., the uncorrelated account and the correlated account). As an example, in one embodiment, such a similarity metric may be determined using a proper similarity function (e.g., Jaccard similarity). Alternatively, a dissimilarity measure, of entitlement or identity binary vectors, d, may be chosen, then the induced similarity, $1-d(x,y)$, may be used to assign the similarity metric to two accounts x,y. Other methods for determining a similarity weight between two accounts are possible and are fully contemplated herein.

Based on the similarity metric, the accounts from the source system (e.g., the set of uncorrelated accounts and correlated accounts) may be clustered. This clustering may be, for example, by hierarchical clustering or statistical clustering such as K-modes, or K-modes used in association with a data-mining, pattern-finding algorithm such as Equivalence Class Transformation (ECLAT). The cluster (peer group) including the uncorrelated account of interest can then be determined. From this peer group, the peer correlated accounts associated with the uncorrelated account of interest can be determined. In other words, the peer correlated accounts may be correlated accounts that are part of the determined peer group (cluster) that includes the uncorrelated account. These peer correlated accounts (as determined from the peer group of accounts determined for the uncorrelated account) can then serve as the basis for determining target identities for crowdsourcing (i.e., the crowdsourcing targets). For example, the identities associated with the peer correlated accounts may be used as a crowdsourcing target or used to identify an identity of a manager associated with the peer correlated account (e.g., the manager of the identity associated with that peer correlated account) to utilize as a crowdsourcing target.

Once the crowdsourcing targets are identified (e.g., the identities identified as crowdsourcing targets), a communication may be sent to these crowdsourcing targets. This communication may be sent through almost any computer network based communication channel desired, such as presenting it on a web based interface for an identity management system, a thick or thin client application (e.g., for an identity management system), an email to the crowdsourcing target, a text or interoffice message, or on some other communication channel. Such a crowdsourcing communication may request input on the uncorrelated account. For example, the communication may present a crowdsourcing target with a list of identities that report to (or are otherwise associated with) that crowdsourcing target and the uncorrelated account and ask for input regarding whether the uncorrelated account should belong to any of the reporting identities (e.g., should the account be correlated with any of the identities that report to the crowdsourcing target). Additionally, the crowdsourcing communication may provide other data regarding the uncorrelated account, the reporting identities or why the crowdsourcing target was selected, including for example, number, percentage, ratio, etc. of reporting identities (e.g., those reporting identities' account on the source system) that share entitlements associated with the uncorrelated account, a probability ranking that the uncorrelated account should be correlated with a particular reporting entity, or other information. The crowdsourcing communication may thus ask for a "vote" or the crowdsourcing target's input on which reporting identity should be correlated with the uncorrelated account, a ranking of the reporting identities with respect to the uncorrelated account, etc.

Input can then be received back from these crowdsourcing communication at the identity management system. Based on the input from the crowdsourcing targets the uncorrelated account may (or may not be) correlated with an identity at the identity management system. For example, votes on each of the reporting identities with respect to the uncorrelated account may be received from multiple crowdsourcing targets and the votes from each of the crowdsourcing targets with respect to the uncorrelated account and the reporting identities may be used to determine whether to correlate an identity with the uncorrelated account and, if so, which identity to correlate with the uncorrelated account (e.g., the identity with the most votes may be correlated with the uncorrelated account). In some case, if the uncorrelated account cannot be correlated with an identity it may be deleted (e.g., an deleted from the source system from which it was obtained).

As will be understood, there may be a large volume of accounts that may originate from a source system. Thus, from a practical standpoint, it may be undesirable to utilize crowdsourcing to correlate, or otherwise obtain insights, into all the accounts that may obtained from the source system, as this would entail numerous, repetitive, and potentially bothersome communication with many people within the enterprise. Many embodiments may thus employ an initial, more automated correlation, to reduce the number of accounts for which crowdsourcing may be applied. Thus, some embodiments may perform an initial correlation of accounts obtained from a source system to identities represented at the identity management system. This initial correlation of accounts with identities in the system may be, for example, a machine learning based or another type of correlation that may be performed on accounts obtained from the source system such that at the end of this initial correlation there may be a set of correlated accounts (e.g., accounts correlated with identities) obtained from the source system, and a set of uncorrelated accounts that could not be correlated by the initial correlation.

Moreover, in some embodiments, the set of uncorrelated accounts may be paired down before finding crowdsourcing targets by eliminating (e.g., and deleting from the source system) certain of the uncorrelated accounts. For example, when the accounts are obtained from the source system the account data from the source system may include the entitlements of that account along with other account data such as usage data for the account (e.g., login activity or last login or use time), or other account attributes such as whether the account is enabled (or disabled). This other account data may be used to cull the uncorrelated accounts. As but some examples, uncorrelated accounts that do not have any login activity (or any login activity within a certain time) may be deleted, uncorrelated accounts with no (or fewer than some threshold number of) entitlements, or that only have certain (e.g., low level) entitlements, may be deleted or disabled accounts may be deleted. In this manner the uncorrelated accounts for which crowdsourcing may be performed may only be those which are active (e.g., within a certain time) and that have some number or type of entitlements.

Embodiments thus provide numerous advantages over previously available systems and methods for associating account data. First and foremost, the coverage and accuracy of the associations between accounts and identities may be significantly improved. Furthermore, embodiments as disclosed may offer the technological improvement of reducing the computational burden and memory requirements of systems implementing these embodiments as the accounts may be initially correlated.

In one embodiment, therefore, an identity management system may obtain identity management data associated with a plurality of source systems in a distributed enterprise computing environment, the identity management data comprising data on a set of identity management artifacts utilized in identity management in the distributed enterprise computing environment. The plurality of source systems include a non-authoritative source system and an authoritative source system and the identity management data comprises account data on accounts from the non-authoritative source system and identity data on identities from the authoritative source system.

Embodiments of the identity management system can determine a set of uncorrelated accounts of the accounts from the non-authoritative source system and a set of correlated accounts from the account from the non-authoritative source system, wherein each of the set of correlated accounts is associated with an identity of the identities from the authoritative source system. A similarity measure can be determined between each uncorrelated account and each of the set of correlated accounts and the accounts clustered to determine a set of account clusters. The clustering may be based on the similarity measure between each uncorrelated account and each of the set of correlated accounts, wherein each account cluster comprising uncorrelated accounts and correlated accounts from the non-authoritative source system. For an uncorrelated account of the set of uncorrelated accounts (e.g., an uncorrelated account of interest), an account cluster that includes the first uncorrelated account may be determined. From this account cluster peer correlated accounts in the account cluster can be determined, wherein each peer correlated account is one of the set of uncorrelated accounts included in the account cluster. A crowdsourcing target can be determined based on the peer correlated accounts, wherein the crowdsourcing target is a first identity of the set of identities, and a crowdsourcing communication associated with the uncorrelated account sent to the crowdsourcing target.

In some embodiments, determining a crowdsourcing target may include determining a second identity that is correlated with the peer correlated accounts and determining that the first identity is a manager of the second identity.

In various embodiments, an initial correlation may be performed between the accounts from the non-authoritative source system with the identities to determine the set of uncorrelated accounts and the set of correlated accounts. Such an initial correlation may be performed, for example, by a machine learning model specific to the non-authoritative source system.

In one embodiment, a subset of uncorrelated accounts may be determined for deletion (e.g., before crowdsourcing targets are determined). This subset of uncorrelated accounts may be determined, for example, based on login activity or a last usage time associated with each account of the subset of uncorrelated accounts, or other account data.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE FIGURES

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before delving into more detail regarding the specific embodiments disclosed herein, some context may be helpful. In response to regulatory requirements and security access risks and concerns, most enterprises have implemented some form of computer security or access controls. To assist in implementing security measures and access controls in an enterprise environment, many of these enterprises have implemented Identity Management in association with their distributed networked computer environments. Identity Management solutions allow the definition of particular identity management artifacts (including but not limited to, an identity, entitlement, application, account, role, event, policy, group, permission, user, owner, source, configuration, organization, violation, governance group, access profile or account activity) such that these artifacts may be associated and managed accordingly. For example, an identity may be almost physical or virtual thing, place, person or other item that an enterprise would like to define. Identities can therefore be, for example, certain capacities (e.g., manager, engineer, team leader, etc.), titles (e.g., Chief Technology Officer), groups (development, testing, accounting, etc.), processes (e.g., nightly back-up process), physical locations (e.g., cafeteria, conference room), individual users or humans (e.g., John Locke) or almost any other physical or virtual thing, place, person or other item.

To continue with these example of how these identity governance artifacts may be used, each of these identities may therefore be associated with zero or more accounts with respect to the distributed networked computer environments. An account may be a defined relationship with a source system within the enterprise environment, with a distinct identifier for that source system. Each of these accounts may, in turn, be associated with zero or more entitlements for that source system. An entitlement associated with an account of the source system may be the ability to perform or access a function offered, or associated with, the source system, including, for example, accessing computing systems, applications, file systems, particular data or data items, networks, subnetworks, or network locations, etc. Thus, each of the identities may be assigned zero or more entitlements with respect to the distributed networked computer environments, where at least some of these entitlements may be assigned by virtue of an account with those entitlements being assigned to the identity.

Additionally, to facilitate the assignment of these entitlements, enterprises may also be provided with the ability to define roles or other identity management artifacts within the context of their Identity Management solution. A role within the context of Identity Management may be a collection of entitlements. These roles may be assigned a name or identifiers (e.g., manager, engineer, team leader) by an enterprise that designate the type of user or identity that should be assigned such a role. By assigning a role to an identity in the Identity Management context, the identity may be assigned the corresponding collection of entitlements associated with the assigned role. Accordingly, by defining these roles enterprises may define a "gold standard" of what they desire their identity governance to look like.

Thus, by managing the identity management artifacts using an identity management system, identity governance may be facilitated. For example, by managing the artifacts (e.g., identity or identities, accounts, roles, entitlements, etc.) to which users within the enterprise computing environment are assigned, the accounts, entitlements, or roles to which a user may be assigned (e.g., the functions or access which a user may be allowed) may be controlled. Furthermore, by defining other identity management artifacts, such as more granular access permissions, identity management events or activity may also be determined and evaluated to assess security risk or compliance with identity management policies or rules.

Figure 1:
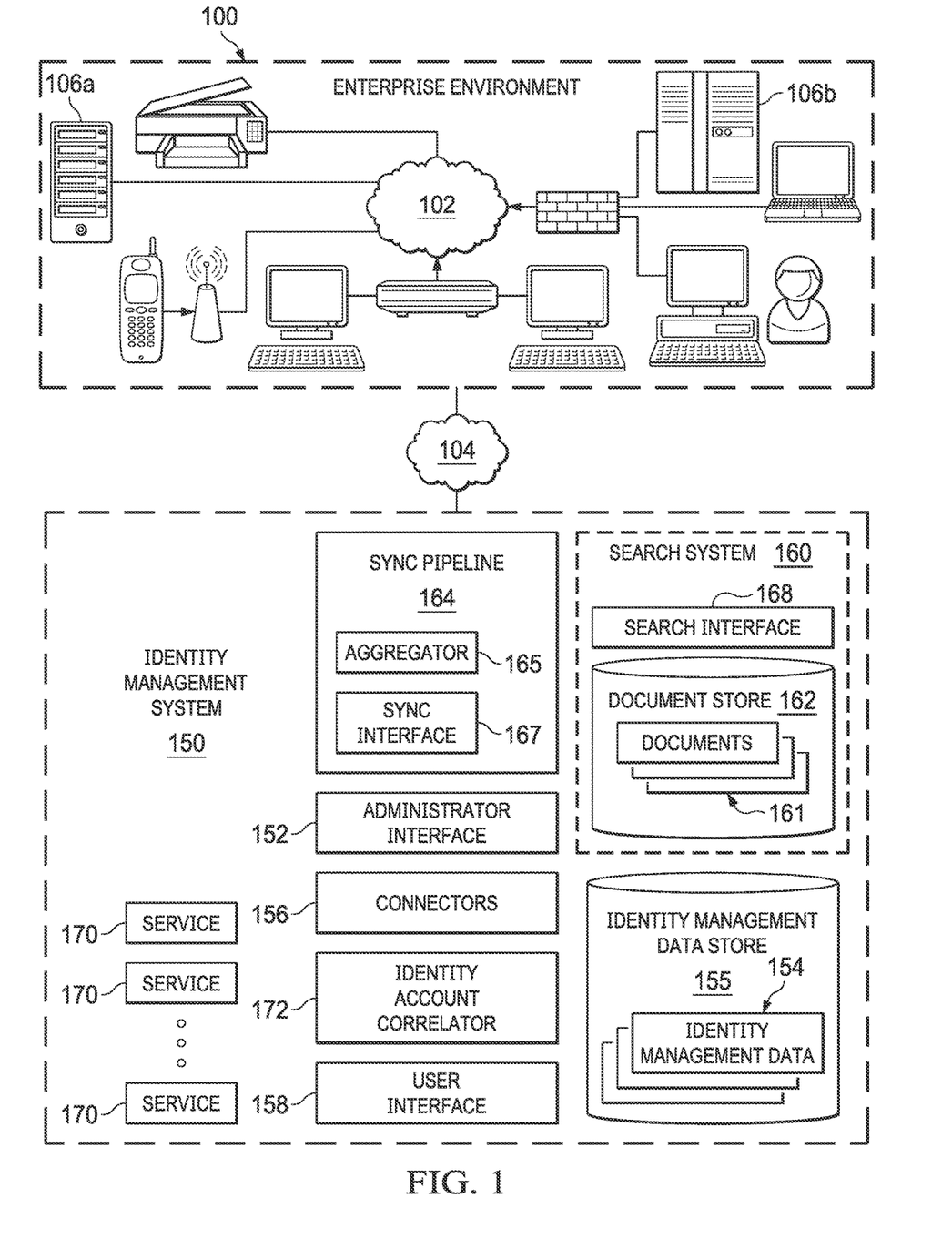
FIG. 1 is a block diagram of a distributed networked computer environment including one embodiment of an identity management system.

Turning then to FIG. 1, then, a distributed networked computer environment including one embodiment of such an identity management system is depicted. Examples of such identity management systems are discussed, for example, in U.S. Pat. No. 10,681,056 entitled "System and Method for Outlier and Anomaly Detection in Identity Management Artificial Intelligence Systems Using Cluster Based Analysis of Network Identity Graphs," issued to Badawy et al on Jun. 9, 2020, and incorporated herein by reference in its entirety for all purposes.

Here, the networked computer environment may include an enterprise computing environment 100. Enterprise environment 100 includes a number of computing devices or applications that may be coupled over a computer network 102 or combination of computer networks, such as the Internet, an intranet, an internet, a Wide Area Network (WAN), a Local Area Network (LAN), a cellular network, a wireless or wired network, or another type of network. Enterprise environment 100 may thus include a number of resources, various resource groups and users associated with an enterprise (for purposes of this disclosure any for profit or non-profit entity or organization). Users may have various roles, job functions, responsibilities, etc. to perform within various processes or tasks associated with enterprise environment 100. Users can include employees, supervisors, managers, IT personnel, vendors, suppliers, customers, robotic or application based users, etc. associated with enterprise 100.

Users may access resources of the enterprise environment 100 to perform functions associated with their jobs, obtain information about enterprise 100 and its products, services, and resources, enter or manipulate information regarding the same, monitor activity in enterprise 100, order supplies and services for enterprise 100, manage inventory, generate financial analyses and reports, or generally to perform any task, activity or process related to the enterprise 100. Thus, to accomplish their responsibilities, users may have entitlements to access resources of the enterprise environment 100. These entitlements may give rise to risk of negligent or malicious use of resources.

Specifically, to accomplish different functions, different users may have differing access entitlements to differing resources, including applications offered by source systems within the enterprise environment. Some access entitlements may allow particular users to obtain, enter, manipulate, etc. information in resources which may be relatively innocuous. Some access entitlements may allow particular users to manipulate information in resources of the enterprise 100 which might be relatively sensitive. Some sensitive information can include human resource files, financial records, marketing plans, intellectual property files, etc. Access to sensitive information can allow negligent or malicious activities to harm the enterprise itself. Access risks can thus result from a user having entitlements with which the user can access resources that the particular user should not have access to; gain access to another user's entitlements or for other reasons. Access risks can also arise from roles in enterprise environment 100 which may shift, change, evolve, etc. leaving entitlements non optimally distributed among various users.

To assist in managing the artifacts (e.g., identity, entitlement, roles, etc.) assigned to various users and more generally in managing and assessing access risks in enterprise environment 100, an identity management system 150 may be employed. Such an identity management system 150 may allow an administrative or other type of user to define one or more identity management artifacts such as an identity, entitlement, role, account, event, access profile or account activity, and associate these defined identity management artifacts using, for example, an administrator interface 152. For example, defined identities may be associated with accounts, entitlements, or roles. The assignment may occur, for example, by directly assigning an entitlement to an identity, or by assigning an account or role to an identity whereby the collection of entitlements comprising the account or role are thus associated with the identity. Examples of such identity management systems are SailPoint's IdentityIQ and IdentityNow products. Note here, that while the identity management system 150 has been depicted in the diagram as separate and distinct from the enterprise environment 100 and coupled to enterprise environment 100 over a computer network 104 (which may the same as, or different than, network 102), it will be realized that such an identity management system 150 may be deployed as part of the enterprise environment 100, remotely from the enterprise environment, as a cloud based application or set of services, or in another configuration.

It may be helpful to illustrate some examples of identity management artifacts and their usage. As one example, an identity may thus be almost physical or virtual thing, place, person or other item that an enterprise would like to define. Thus, an identity may be an individual or group of users or humans, employees, a virtual entity like a sensor or a robot, an account and may include capacity, title, groups, processes, physical locations, or almost any other physical or virtual thing, place, person or other item. In one embodiment, an Identity may be an authoritative account that includes a first name, a last name and an email address. As another example, an entitlement may be the ability to perform or access a function within the distributed networked enterprise computer environment 100, including, for example, accessing computing systems, applications, file systems, physical locations, particular data or data items, networks, subnetworks or network locations, etc. Entitlements may also define the actions a user can take with respect to that access. Each of these identities may therefore be assigned zero or more entitlements with respect to the distributed networked computer environments.

Thus, another type of identity management artifact may be an account representing an account at a source system. An account may be a defined relationship with a source system within the enterprise environment, with a distinct identifier for that source system. Each of these accounts may, in turn, be associated with zero or more entitlements for that source system. An entitlement associated with an account of the source system may be the ability to perform or access a function offered, or associated with, that source system, including, for example, accessing computing systems, applications, file systems, particular data or data items, networks, subnetworks, or network locations, etc. Identities can therefore be associated with (e.g., correlated to) accounts obtained from a source system and by virtue of this correlation the identity may be associated with the entitlements of that account.

Another example of an identity management artifact may be a role. Roles may be used to facilitate the assignment of these entitlements. Thus, enterprises may also be provided with the ability to define roles through the identity management system 150. A role within the context of the identity management system 150 may be a collection of entitlements, or access profiles, that may span different source systems. These roles may be assigned a name or identifiers (e.g., manager, engineer, team leader) by an enterprise that designate the type of user or identity that should be assigned such a role. By assigning a role to an identity or group of identities using the identity management system 150, the identity may be assigned the corresponding collection of entitlements or access items associated with the assigned role. Similarly, enterprises may also be provided with the ability to define access profiles. An access profile may be a set of entitlements that represent a level of logical access (e.g., user, guest, administrator, etc.) to a source or applications.

Connectors 156 of the identity management system 150 may thus request or otherwise obtain data from various touchpoint (or source) systems within enterprise environment 100 to obtain identity management data 154. These source systems may implement applications or provide other functionality, and include, for example Active Directory systems, Java Database Connectors within the enterprise 100, Microsoft SQL servers, Azure Active Directory servers, OpenLDAP servers, Oracle Databases, SalesForce applications, ServiceNow applications, SAP applications or Google GSuite.

The identity management system 150 can store identity management data 154 in an identity management data store 155. This identify management data store 155 may be, for example, a relational data store, including SQL based data stores such as a MySQL database or the like. The identity management data 154 stored may include a set of entries, each entry corresponding to an identity management artifact as discussed. For example, the identity management data 154 may include entries on an identity (e.g., alphanumerical identifiers for identities) as defined and managed by the identity management system, an organizational hierarchy of the identities of an enterprise (e.g., a management structure or hierarchy of the enterprise relating the identities of the enterprise), a list of accounts correlated to that identity, a list or vector of entitlements (which may be associated with an account), roles or access profiles assigned to that identity by the identity management system or other types of artifacts. A time stamp at which the identity management data was collected (e.g., from a source system) may be associated with the data for a particular artifact. Other data could also be associated with each artifact, including data that may be provided from other systems such as a title, location or department associated with the identity. In one embodiment, the identity management data 154 for an artifact (e.g., identity) can be stored in a "cube" (a set of interrelated data) (e.g., "Identity Cube") where all identity management data 154 associated with a particular artifact (e.g., for an identity all of their accounts from all data sources, and all attributes and entitlements of those accounts) may be associated. These identity cubes may be related to each other for various purposes, including for example, to provide the organizational hierarchy of the identities in relation to the enterprise.

As another example, the identity management data 154 may also include entries corresponding to accounts, entitlements, or roles, where each entry for a role may include the role identifier (e.g., alphanumerical identifier or name for the role) and a list or vector of the entitlements associated with each role. Other data could also be associated with each role, such as a title, location or department associated with the role. An entry for an account may include account data that can include an identifier for that account, the entitlements of that account along with other account data such as usage data for the account (e.g., login activity or last login or use time), or other account attributes such as whether the account is enabled (or disabled). Moreover, the identity management data 154 may also include event data collected from various systems within the enterprise environment 100 that is associated with the identities, accounts, entitlement, etc. defined in the identity management data 154 through the evaluation or analysis of these events or other data in an identity management context. A user may interact with the identity management system 150 through a user interface 158 to access or manipulate data on identities, accounts, roles, entitlements, events or generally perform identity management with respect to enterprise environment 100.

As part of a robust identity management system 150, it is thus desirable to effectively search the identity management data 154 associated with an enterprise 100. Specifically, it is desired to provide an identity management system 150 with effective ways to store, index and search such identity management data 154 to increase the efficacy of search of identity management data 154 at least by speeding the searching of such identity management data 154 and improving the results of this searching. Identity management system 150 may thus include search system 160 having an identity management document store 162 (also referred to herein as a search index). This identity management document store (or just document store) 162 may, in one embodiment, be a NoSQL data store designed to index, store, access, retrieve and search documents 161 such as, for example, Elasticsearch, MongoDB, Azure Cosmos or the like. The document store 162 may thus include an interface (e.g., a REpresentational State Transfer (REST) API or the like) whereby requests for the indexing, access or searching of documents 161 may be sent through the interface. This interface may receive queries in a native syntax specific to the data store 162 and return results to those queries.

Search system 160 may store data included in, or derived from, identity management data 154 in the document store 162 using such an interface. Specifically, in certain embodiments, the search system 160 may be in communication with a sync pipeline 164. The sync pipeline 164 may access the identity management data 154 and evaluate the identity management data 154 of the relational data store to transform the identity management data 154 stored therein into documents according to a denormalized document model for identity management artifacts. The sync pipeline 164 can then generate messages for indexing and storing these documents in the document store 162 and send the indexing messages to the search service 160 either atomically or in bulk. These indexing messages may instruct a document store 162 to store documents for identity management artifacts or to nest one or more identity management artifacts in an associated identity management artifact.

In one embodiment, sync pipeline 164 may include an aggregator 165. The aggregator 165 may at some time interval, receive updates from, or query, the identity management data store 155 to identify which artifacts have been created, updated, and deleted. The aggregator 165 can also query the identity management data 154 to determine data associated with those artifacts. Additionally, the sync pipeline 164 may include a sync interface 167 through which indexing messages (e.g., events) may be received from various services 170 employed by the identity management system 150 (e.g., when those services have data they wish to be indexed in documents 161 in document store 162). Based on the artifacts the sync pipeline can assemble a sync message (e.g., a indexing message) for one or more artifacts (e.g., a message for creating, updating or deleting a document 161 corresponding to that artifact in the document store 162). In one embodiment, the aggregator 165 may serve to buffer, merge or orchestrate determined data, received indexing messages or the sending of sync messages such that requests (e.g., sync or indexing messages) to the other components (e.g., the document store 162) of the identity management system may be efficiently dispatched while still maintaining substantially real-time updates to the documents 161 in the document store 162.

These indexing messages can be received by the document store 162 and used to index the data for documents 161 for the identity management artifacts in the document store 162. In particular, the document store 162 may be configured according to a mapping definition which tells the document store 162 how to index the fields stored in the documents 161 stored therein. The documents 161 in the data store may thus represent the identity management artifacts of the enterprise environment 100 according to a nested denormalized document model. There may thus be a document for each artifact (e.g., identity, entitlement, role, event, access profile, account activity, etc.) associated with the enterprise environment 100. In certain embodiments, these documents formed according to the data model may be nested documents whereby a document for an identity management artifact (e.g., such as an identity, role, event, etc.) may include, as a nested or child document, documents for related identity management artifacts, even in instances where documents for those related identity management artifacts may be separately stored and indexed in the document store 162 (e.g., as top level, root, or parent documents). In other words, in certain embodiments the documents 161 are formed according to a data model by which certain documents 161 for related artifacts may be nested inside those related documents 161, even in cases where those documents 161 are themselves stored independently in the document store 162 (e.g., as separate documents 161). This configuration may allow more efficient storage and searching of related documents or objects in the document store 162. For example, an Identity document may have zero or more nested accesses, accounts, groups or application documents related to that Identity document, even in instances where those accesses, groups, accounts or applications are themselves maintained as separate documents 161 in the document store 162.

As an example of identity management data that may be obtained from an identity management system, the following is one example of a JavaScript Object Notation (JSON) object that may relate to an identity:

```
{
    "attributes": {
        "Department": "Finance",
        "costcenter": "[R01e, L03]",
        "displayName": "Catherine Simmons",
        "email": "Catherine.Simmons@demoexample.com",
        "empId": "1b2c3d",
        "firstname": "Catherine",
        "inactive": "false",
        "jobtitle": "Treasury Analyst",
        "lastname": "Simmons",
        "location": "London",
        "manager": "Amanda.Ross",
        "region": "Europe",
        "riskScore": 528,
        "startDate": "12/31/2016 00:00:00AM UTC",
        "nativeIdentity_source_2": "source_2",
        "awesome_attribute_source_1": "source_1",
        "twin_attribute_a": "twin a",
        "twin_attribute_b": "twin b",
        "twin_attribute_c": "twin c"
    },
```

```
    "id": "2c9084ee5a8de328015a8de370100082",
    "integration_id": "iiq",
    "customer_id": "ida-bali",
    "meta": {
        "created": "2017-03-02T07:19:37.233Z",
        "modified": "2017-03-02T07:24:12.024Z"
    },
    "name": "Catherine.Simmons",
    "refs": {
        "accounts": {
            "id": [
                "2c9084ee5a8de328015a8de370110083"
            ],
            "type": "account"
        },
        "tags": [
            {
                "id": "2c9084ee5a8ad545345345a8de370110083"
                "name": "SOD-SOX",
                "type": "TAG"
            },
            {
                "id": "2c9084ee5a8ad545345345a8de370122093"
                "name" : "PrivilegedAccess",
                "type": "TAG"
            },
        ]
        "entitlements": {
            "id": [
                "2c9084ee5a8de328015a8de449060e54",
                "2c9084ee5a8de328015a8de449060e55"
            ],
            "type": "entitlement"
        },
        "manager": {
            "id": [
                "2c9084ee5a8de022015a8de0c52b031d"
            ],
            "type": "identity"
        }
    },
    "type": "identity"
}
```

As another example of identity management data that may be obtained from an identity management system, the following is one example of a JSON object that may relate to an entitlement:

```
{
  "integration_id": "bd992e37-bbe7-45ae-bbbf-c97a59194cbc",
  "refs": {
    "application": {
      "id": [
        "2c948083616ca13a01616ca1d4aa0301"
      ],
      "type": "application"
    }
  },
  "tags": [
      {
          "id": "2c9084ee5a8ad545345345a8de370110083"
          "name" : "SOD-SOX",
          "type": "TAG"
      },
      {
          "id": "2c9084ee5a8ad545345345a8de370122093"
          "name" : "PrivilegedAccess",
          "type": "TAG"
      },
  ]
  "meta": {
     "created": "2018-02-06T19:40:08.005Z",
     "modified": "2018-02-06T19:40:08.018Z"
  },
  "name": "Domain Administrators",
  "attributes": {
     "description": "Domain Administrators group on Active Directory",
     "attribute": "memberOf",
     "aggregated": true,
     "requestable": true,
     "type": "group",
     "value": "cn=Domain Administrators,dc=domain,dc=local"
  },
  "id": "2c948083616ca13a01616ca1f1c50377",
  "type": "entitlement",
  "customer_id": "3a60b474-4f43-4523-83d1-eb0fd571828f"
}
```

Search system 160 may thus offer an interface 168 through which the documents in the document store 162 may be queried. This interface may allow queries to be submitted where the queries may be formulated according to a search query string syntax that allows the querying of nested documents (or data in nested documents) of the document store 162. The search interface 168 can receive these queries, formulated according to the search query string syntax, and may evaluate the received queries to extract nested search expressions (e.g., expressions of a search query related to nested documents). The documents 161 of the document store 162 can then be searched based on the query, whereby any nested document within the documents 161 identified in the search query may be searched according to their specified search terms.

As may be recalled from the above discussion, connectors 156 of the identity management system 150 may thus request or otherwise obtain data from a variety of source systems within enterprise environment 100 to obtain identity management data 154. These source systems may include, for example Active Directory systems, Java Database Connectors within the enterprise 100, Microsoft SQL servers, Azure Active Directory servers, OpenLDAP servers, Oracle Databases, SalesForce applications, ServiceNow applications, SAP applications or Google GSuite. For example, connectors 156 may obtain data on accounts from a source system. As discussed, an account may be a defined relationship with a source system within the enterprise environment, with a distinct identifier for that source system. Each of these accounts may, in turn, be associated with zero or more entitlements for that source system. The volume of data ingested from such source systems may thus be quite large.

It is axiomatic that to manage, aggregate, or visualize users and their accesses along with other pertinent IM data, it is first necessary to determine what the identity management artifacts pertinent to the organization are. Given the volume of data within an enterprise that may be obtained to determine IM data on identities, entitlements, roles, groups, or other identity management artifacts, and the typically large number of source systems from which the data may be obtained, correlating or processing this data to make canonical determinations about identities or other artifacts and more generally, associate such data pertaining to like artifacts may be extremely difficult. Such problems may manifest, for example, during a deployment process of an identity management system 150 with respect to an enterprise environment 100 (e.g., an initial deployment or integration of identity management system 150 with enterprise environment 100 or a subsequent harvesting of data from a source system within the enterprise environment 100) as hundreds or thousands of accounts are harvested by connectors 156 across the source systems of the enterprise environment 100.

Identity management system 150 may thus need a way to effectively deal with volume of such data from the source systems to allow this identity management data to be effectively evaluated and understood. Specifically, in most cases, identity management system 150 obtains data on identity management artifacts from various touchpoint (or source) systems within an enterprise environment 100 through connectors 156. The obtained data is stored in identity management data 154, then processed to determine identity management artifacts (or updates to identity management artifacts) to be stored and maintained at the identity management system 150 in identity management data 154 to facilitate identity governance with respect to the enterprise. This process is sometimes referred to as data ingestion or the data ingestion stage.

This data ingestion stage therefore usually determines and associates identity management artifacts (e.g., identities, accounts, entitlements, etc.) in a manner that facilitates identity governance of those artifact. This ingestion stage is however, quite complex. There is usually a large amount of data that is collected from different source systems that pertains to the same identity management artifact. For example, with respect to identities, during a data ingestion stage, tens, or hundreds, of thousands (or more) accounts may be harvested from different source systems across an enterprise. Some of these accounts may pertain to the same user, or more generally to the same identity. Thus, to establish an identity at the identity management system, where that identity may be a canonical identity management artifact for that identity it may be desired to correlate or match (used interchangeably herein) the various accounts from across source systems to determine which accounts should be associated with the same identity.

To illustrate in more detail, certain source systems (e.g., source system 106*a*) may be designated as, or determined to be, an authoritative source system. Accounts from these authoritative source systems may include direct, identity-specific information (e.g., such as a Social Security Number or the like) that makes it possible to establish a comprehensive list of the identities within the enterprise. An example of such an authoritative source system may be a human resources system or the like. The data on accounts from these authoritative source systems (e.g., source system 106*a*) may be harvested by connectors 156 and stored in identity management data 154, where each account from these authoritative source systems may be taken as referring to an identity that may be used for IM purposes. These accounts (e.g., a set of data associated with a distinct account at the authoritative source system) from authoritative source systems (e.g., source system 106*a*) are thus referred to herein without loss of generality as identity accounts. These identity accounts may thus be definitively correlated with (or used to create) an identity. As discussed, the identity management data 154 for an artifact (e.g., identity) can be stored in a cube (e.g., "Identity Cube") where all identity management data 154 associated with a particular artifact (e.g., for an identity all of their accounts from all data sources, and all attributes and entitlements of those accounts) may be associated.

Other source systems (e.g., source system 106*b*) within the enterprise environment 100 may be non-authoritative source systems (e.g., that do not contain such direct, identity specific information). The data on accounts from these non-authoritative source systems (e.g., source system 106*b*) may also be harvested by connectors 156 and stored in identity management data 154. To facilitate IM with respect to enterprise environment 100 then, identity management system 150 may need to accurately correlate these other, non-authoritative accounts (e.g., from non-authoritative source system 106*b*) with the corresponding identities (e.g., that may be correlated with or created from accounts from the authoritative source system 106*a*).

To those ends, among others, embodiments of the identity management system 150 may include an identity account correlator 172 which correlates accounts from source systems 106 (e.g., non-authoritative source system 106*b*) with identities, where such a correlation may employ crowdsourcing. Specifically, embodiments of identity account correlator 172 may be adapted to initially correlate accounts from a source system 106 (e.g., a non-authoritative source system 106*b*) such that a set of accounts from the source system 106 are correlated accounts (e.g., accounts correlated with identities) while the remaining accounts from the source system 106 are uncorrelated accounts. Identity account correlator 172 may also be adapted to crowdsource data on these uncorrelated accounts.

In particular, identity account correlator 172 may accurately determine to whom crowdsourcing requests should be sent for each individual account of the uncorrelated accounts (e.g., a crowdsourcing target for that account). These crowdsourcing targets are thus a target subset of users associated with the enterprise determined based on an uncorrelated account, and the crowdsourcing targets may be specific for that uncorrelated account. Accordingly, identity account correlator 172 may serve to refine crowdsourcing targets for crowdsourcing information about uncorrelated accounts based on previously determined knowledge from the enterprise environment 100, including identity management data 154 previously determined or associated with respect to that enterprise environment 100. By accurately scoping or targeting the universe of users within the enterprise to whom the crowdsourcing requests for accounts may be sent (in some cases to a single user), the potential burden on the users of the enterprise may be reduced while substantially increasing the likelihood of generating a response to such crowdsourcing requests and simultaneously improving the data obtained from those responses.

Specifically, identity management data 154 from a non-authoritative source system 106*b* may comprise account data on accounts from the non-authoritative source system 106*b*. These accounts may include account data such as entitlements associated with access rights to the application implemented by the source system along with other account data such as usage data for the account (e.g., login activity or last login or use time), or other account attributes such as whether the account is enabled (or disabled). Based on this account data for an uncorrelated account, embodiments may be adapted to determine identities within the enterprise to whom crowdsourcing requests should be sent. Such a determination may leverage the correlated accounts from the source system by finding correlated accounts that are associated with the uncorrelated account and using these associated correlated accounts to determine the identities to whom the request for crowdsourcing should be sent.

Once the crowdsourcing targets are identified (e.g., the identities identified as crowdsourcing targets), a communication may be sent (e.g., by the identity account correlator 172 or other interface of the identity management system 150) to these crowdsourcing targets (e.g., users of the enterprise environment 100). This communication may be sent through almost any computer network based communication channel desired, such as presenting it on a web based interface for an identity management system, a thick or thin client application (e.g., for identity management system 150), an email to the crowdsourcing target, a text or interoffice message, or on some other communication channel. Such a crowdsourcing communication may request input on the uncorrelated account. For example, the communication may present a crowdsourcing target with a list of identities that report to (or are otherwise associated with) that crowdsourcing target and the uncorrelated account and ask for input regarding whether the uncorrelated account should belong to any of the reporting identities (e.g., should the account be correlated with any of the identities that report to the crowdsourcing target). Additionally, the crowdsourcing communication may provide other data regarding the uncorrelated account, the reporting identities or why the crowdsourcing target was selected, including for example, number, percentage, ratio, etc. of reporting identities (e.g., those reporting identities' account on the source system) that share entitlements associated with the uncorrelated account, a probability ranking that the uncorrelated account should be correlated with a particular reporting entity, or other information. The crowdsourcing communication may thus ask a user for a "vote" or the crowdsourcing target's input on which reporting identity should be correlated with the uncorrelated account, a ranking of the reporting identities with respect to the uncorrelated account, etc.

Input can then be received back from these crowdsourcing communication at the identity management system 150 (e.g., at the identity account correlator 172). Based on the input from the crowdsourcing targets, the uncorrelated account may (or may not be) correlated with an identity in the identity management data 154 at the identity management system 150 (e.g., the account may be associated with an Identity Cube for an identity). For example, votes on each of the reporting identities with respect to the uncorrelated account may be received from multiple crowdsourcing targets and the votes from each of the crowdsourcing targets with respect to the uncorrelated account and the reporting identities may be used to determine whether to correlate an identity with the uncorrelated account and, if so, which identity to correlate with the uncorrelated account (e.g., the identity with the most votes may be correlated with the uncorrelated account). In some cases, if the uncorrelated account cannot be correlated with an identity it may be deleted (e.g., deleted from the source system from which it was obtained).

Figure 2A:
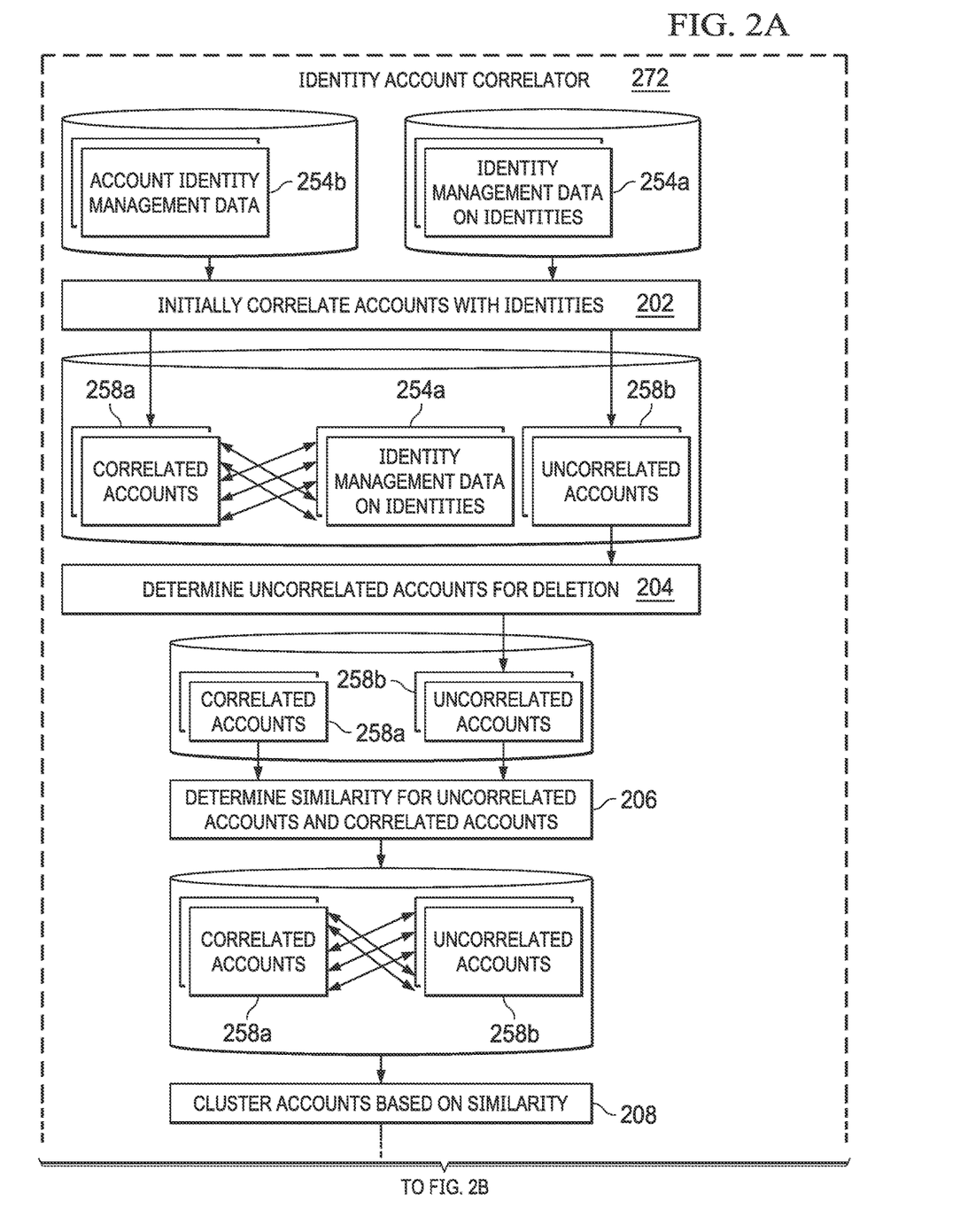
FIGS. 2A and 2B are a block diagram of an architecture of an identity account correlator.
Figure 2B:
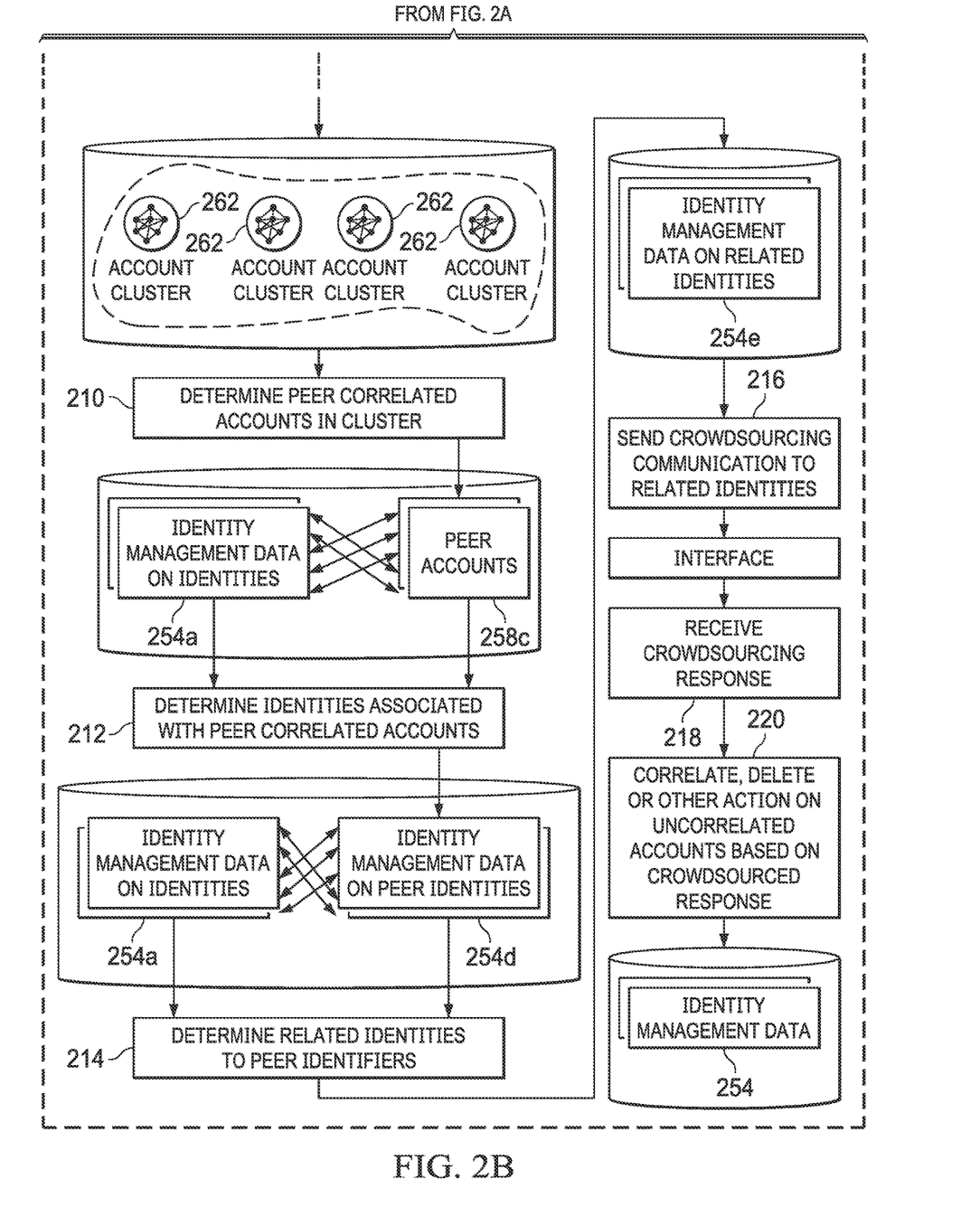

Turning then to FIGS. 2A and 2B, one embodiment of the architecture and functioning of an identity account correlator is depicted. Here, identity account correlator 272 may access identity management data in an identity management data store, where that identity management data 254 includes account identity management data 254*b* on accounts that was obtained from a non-authoritative source system during data collection from an enterprise environment, and identity management data 254*a* on identities (e.g., an Identity Cube, including identity management data that was obtained from an authoritative source system during data collection from the enterprise environment or is otherwise correlated with that identity).

As will be understood, there may be a large volume of accounts that may originate from a source system. Thus, from a practical standpoint, it may be undesirable to utilize crowdsourcing to correlate, or otherwise obtain insights, into all the accounts that may obtained from the source system, as this would entail numerous, repetitive, and potentially bothersome communication with many people within the enterprise. Many embodiments may thus employ an initial, more automated correlation, to reduce the number of accounts for which crowdsourcing may be applied. Thus, in some embodiments, an initial correlation of accounts obtained from a source system to identities represented at the identity management system may be performed (STEP 202). This initial correlation of accounts with identities in the system may be, for example, a machine learning based or another type of correlation that may be performed on accounts obtained from the source system such that at the end of this initial correlation there may be a set of correlated accounts 258*a* (e.g., accounts correlated with identities of identity management data 254*a*) obtained from the source system, and a set of uncorrelated accounts 258*b* that could not be correlated by this initial correlation. These machine learning models may be trained and may be specific to the (e.g., non-authoritative) source system from which the accounts were obtained. Examples of such machine learning based correlation are given in application Ser. No. 16/814,291, entitled "Systems and Methods for Data Correlation and Artifact Matching in Identity Management Artificial Intelligence Systems" filed on Mar. 10, 2020 by Badawy et al and expressly incorporated herein by reference in its entirety for all purposes.

Moreover, in some embodiments, the set of uncorrelated accounts may be paired down before finding crowdsourcing targets by eliminating (e.g., and deleting from the source system) certain of the uncorrelated accounts. Thus, one or more uncorrelated accounts 258*b* may be determined for deletion (STEP 204). For example, when the accounts are obtained from a source system the account data from the source system may include the entitlements of that account along with other account data such as usage data for the account (e.g., login activity or last login or use time), or other account attributes such as whether the account is enabled (or disabled). This other account data may be used to cull the uncorrelated accounts. As but some examples, uncorrelated accounts 258*b* that do not have any login activity (or any login activity within a certain time) may be deleted, uncorrelated accounts 258*b* from the source system with no (or fewer than some threshold number) of entitlements, or that only have certain (e.g., low level) entitlements, may be deleted or disabled accounts may be deleted. In this manner the uncorrelated accounts 258*b* for which crowdsourcing may be performed may only be those which are active (e.g., within a certain time) and that have some number or type of entitlements.

Accordingly, at this point, there may be a set of correlated accounts 258*a* from the source system (e.g., accounts from the source system that have been correlated to an identity at the identity management system) and a set of uncorrelated accounts 258*b* from the source system (e.g., accounts from the source system that have not been correlated to any identity at the identity management system). In one embodiment then, a similarity metric (e.g., a value or weight representing a similarity) may be determined between each uncorrelated account 258*b* and each of the set of correlated accounts 258*a* from the source system (STEP 206). To illustrate, each of the accounts 258 obtained from the source system may be associated with one or more entitlements (e.g., the ability to perform or access a function associated with the source system). Consequently, in certain embodiments, such a similarity metric may be based on the number of entitlements shared between the accounts being compared (e.g., the uncorrelated account 258*b* and the correlated account 258*a*). As an example, in one embodiment, such a similarity metric may be determined using a proper similarity function (e.g., Jaccard similarity). Alternatively, a dissimilarity measure, of entitlement or identity binary vectors, d, may be chosen, then the induced similarity, $1-d(x,y)$, may be used to assign the similarity metric to two accounts x,y. Other methods for determining a similarity weight between two accounts are possible and are fully contemplated herein.

Based on the similarity metric, the accounts 258 from the source system (e.g., the set of uncorrelated accounts and correlated accounts) may be clustered (STEP 208). This clustering may be, for example, by hierarchical clustering or statistical clustering such as K-modes, or K-modes used in association with a data-mining, pattern-finding algorithm such as Equivalence Class Transformation (ECLAT). The result of such clustering is a set of account clusters 262, where each account cluster comprising accounts 258 from the source system (e.g., correlated accounts 258a, uncorrelated accounts 258b, or both).

For an uncorrelated account 258b for which it is desired to determine one or more crowdsourcing targets (e.g., the uncorrelated account 258b of interest), the cluster 262 (peer group) including that uncorrelated account 258b can then be determined. And, from this associated peer group 262 that includes the uncorrelated account of interest, the peer correlated accounts 258c associated with the uncorrelated account of interest can be determined (STEP 210). In other words, the peer correlated accounts 258c may be correlated accounts 258a that are part of the determined peer group (cluster) 262 that includes the uncorrelated account 258b of interest. These peer correlated accounts 258c (as determined from the peer group of accounts 262 determined for the uncorrelated account 258b) can then serve as the basis for determining target identities for crowdsourcing (i.e., the crowdsourcing targets). For example, the identities associated with the peer correlated accounts 254c may be used as a crowdsourcing target. The peer correlated accounts 254c may be used to determine identities 254d associated with the peer accounts 258c. In other words, the identities 254d to which each peer account 258c is correlated (the peer identities) may be determined (e.g., utilizing identity management data 254a) (STEP 212). These peer identities 254d may, in certain embodiments, be added to the list of crowdsourcing targets for the uncorrelated account of interest. Additionally or alternatively, a manager or other related identity 254e associated with each peer correlated account 254d may be determined (e.g., utilizing identity management data 254a) (STEP 214). Here, the hierarchical organizational relationship of the enterprise associated with the source system as represented in the identity management data 254 may be used to determine these related identities 254e. Specifically, for each peer identity 254d associated with a peer account 258c of the uncorrelated account of interest (e.g., as determined from the peer group 262), the identity of the manager of that peer identity 254d may be determined and added to the list of crowdsourcing targets for the uncorrelated account of interest. It will be understood that the crowdsourcing targets may include other identities as well, including for example owners or other identities associated with management of the application or functionality of the source system.

Once the crowdsourcing targets are identified (e.g., the identities identified as crowdsourcing targets), a communication may be sent to these crowdsourcing targets (STEP 216). This communication may be sent through almost any communication channel (interface) desired, such as presenting it on a web based interface for an identity management system, a thick or thin client application (e.g., for an identity management system), an email to the crowdsourcing target, a text or interoffice message, or on some other communication channel. Such a crowdsourcing communication may request input on the uncorrelated account. For example, the communication may present a crowdsourcing target with a list of identities that report to (or are otherwise associated with) that crowdsourcing target and the uncorrelated account of interest and ask for input regarding whether the uncorrelated account should belong to any of the reporting identities (e.g., should the account be correlated with any of the identities that report to the crowdsourcing target). These identities may be, for example, the peer identities 254d (or a subset thereof) or other identities determined for the uncorrelated account of interest. Additionally, the crowdsourcing communication may provide other data regarding the uncorrelated account, the reporting identities or why the crowdsourcing target was selected, including for example, number, percentage, ratio, etc. of reporting identities (e.g., those reporting identities' account on the source system) that share entitlements associated with the uncorrelated account, a probability ranking that the uncorrelated account should be correlated with a particular reporting entity, or other information. The crowdsourcing communication may thus ask for a "vote" or the crowdsourcing target's input on which reporting identity should be correlated with the uncorrelated account, a ranking of the reporting identities with respect to the uncorrelated account, etc.

Input or other responses (e.g., or lack of response) can then be received back from these crowdsourcing communication at the identity management system (STEP 218). Based on the input from the crowdsourcing targets the uncorrelated account may (or may not be) correlated with an identity at the identity management system or another action may be taken (STEP 220). For example, votes on each of the reporting identities with respect to the uncorrelated account may be received from multiple crowdsourcing targets and the votes from each of the crowdsourcing targets with respect to the uncorrelated account and the reporting identities may be used to determine whether to correlate an identity with the uncorrelated account and, if so, which identity to correlate with the uncorrelated account (e.g., the identity with the most votes may be correlated with the uncorrelated account). In some case, if the uncorrelated account cannot be correlated with an identity it may be deleted (e.g., deleted from the source system from which it was obtained).

It may be helpful here to illustrate a simple example scenario. Suppose within in enterprise environment that there is a source system associated with a Salesforce application. There is a "Professional Services" organization within the enterprise having "John Doe" as a manager, who has three direct reports, "Chris Harris", "Laura Middleton" and "James Cameron" (these will also be used to refer to their identities within the identity management system for purposes of this example). Chris Harris has an Account "ChrisH" with the Salesforce source system correlated with his identity, where this account has an "Account and Reporting Access" entitlement with the Salesforce source system. Laura Middleton has an account "LauraM" with the Salesforce source system correlated with her identity, where this account has an "Account and Reporting Access" entitlement with the Salesforce source system. James Cameron has no Salesforce access or account correlated with his identity.

Similarly, suppose that there is a "Sale Engineering" organization within the enterprise having "Mark Barker" as a manager, who has three direct reports, "Henry Dale", "Katie Foster" and "Ellen Hoffman" (these will also be used to refer to their identities within the identity management system for purposes of this example). Henry Dale has an Account "HenryD" with the Salesforce source system correlated with his identity, where this account has an "Account and Reporting Access" entitlement with the Salesforce source system. Katie Foster and Ellen Hoffman have no Salesforce access or account correlated with their identities.

Now suppose that an uncorrelated account "JamesC" with an "Account and Reporting Access" entitlement is obtained from the Salesforce source system. Here, correlated accounts "ChrisH", LauraM" and "HenryD" may be determined to be similar to the uncorrelated account "JamesC" and clustered together based on their shared entitlement "Account and Reporting Access". Thus, it can be determined that the accounts "ChrisH", LauraM" and "HenryD" are correlated peer accounts to the uncorrelated "JamesC" account. The peer identities Chris Harris, Laura Middleton and Henry Dale associated with these correlated peer accounts from the Salesforce source system can then be determined. From these peer identities (Chris Harris, Laura Middleton, and Henry Dale), the identities of their respective managers John Doe and Mark Barker can be determined. The identities of these managers may be used as crowdsourcing targets to solicit input on the uncorrelated account JamesC.

Specifically, a crowdsourcing communication may be sent to the managers John Doe and Mark Barker requesting input on the uncorrelated account JamesC. For example, the communication may present each of the targets with an associated list of identities that report to (or are otherwise associated with) that crowdsourcing target and the uncorrelated account of interest and ask for input regarding whether the uncorrelated account should belong to any of the reporting identities (e.g., should the account be correlated with any of the identities that report to the crowdsourcing target). Additionally, the crowdsourcing communication may provide other data regarding the uncorrelated account JamesC, the reporting identities or why the crowdsourcing target was selected, including for example, number, percentage, ratio, etc. of reporting identities (e.g., those reporting identities' account on the source system) that share entitlements associated with the uncorrelated account, a probability ranking that the uncorrelated account should be correlated with a particular reporting entity, or other information.

Here, for example, a communication may be sent to John Doe requesting input on the uncorrelated account JamesC and stating that the account JamesC may belong to the identity James Cameron with a "high probability" because 66% of the identities of the manager have accounts with similar entitlements to this account. Similarly, a communication may be sent to Mark Barker requesting input on the uncorrelated account JamesC and stating that the account JamesC may belong to the identity Katie Foster with a "medium probability" because 33% of the identities of the manager have accounts with similar entitlements to this account and that the account JamesC may belong to the identity Ellen Hoffman with a "medium probability" because 33% of the identities of the manager have accounts with similar entitlements to this account.

Input can then be received back from these crowdsourcing communication at the identity management system. Based on the input from the crowdsourcing targets the uncorrelated account James C may (or may not be) correlated with an identity (James Cameron, Katie Foster, Ellen Hoffman, etc.) at the identity management system.

Those skilled in the relevant art will appreciate that the invention can be implemented or practiced with other computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a set of distributed computers communicatively coupled to a network (for example, the Internet). Any suitable programming language can be used to implement the routines, methods or programs of embodiments of the invention described herein, including R, Python, C, C++, Java, JavaScript, HTML, or any other programming or scripting code, etc. Other software/hardware/network architectures may be used. Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a", "an" or "a set" (and "the" when antecedent basis is "a" or "an") includes both singular and plural of such term, unless clearly indicated within the claim otherwise (i.e., that the reference "a", "an" or "a set" clearly indicates only the singular or only the plural). Also, as used in the description herein and throughout the meaning of "in" includes "in" and "on" unless the context clearly dictates otherwise.

What is claimed is:

1. A network security system, comprising:
   a processor;
   a non-transitory, computer-readable storage medium, including computer instructions for:
   obtaining identity management data associated with a source system in an enterprise computing environment, the identity management data comprising account data on accounts of the source system and identity data on identities of the enterprise computing environment;
   determining uncorrelated accounts of the accounts from the source system and correlated accounts from the accounts from the source system, wherein each of the correlated accounts is associated with an identity of the identities from the source system;
   determining a similarity measure based on an uncorrelated account of the set of uncorrelated accounts and the set of correlated accounts;
   clustering the accounts to determine account clusters, the clustering based on the similarity measure based on the uncorrelated account and the set of correlated accounts, wherein an account cluster of the account clusters comprises the uncorrelated account and one or more correlated accounts;
   managing network security of the distributed enterprise computing environment by:
   for the uncorrelated account of the uncorrelated accounts, determining the account cluster including the uncorrelated account;
   determining a peer correlated account in the account cluster, wherein the peer correlated account is one of the correlated accounts included in the account cluster;
   determining a crowdsourcing target based on the peer correlated account, wherein the crowdsourcing target is a first identity associated with the peer correlated account;
   sending a crowdsourcing communication associated with the uncorrelated account to the crowdsourcing target;
   determining a response to the crowdsourcing communication associated with the uncorrelated account; and
   managing network security of the enterprise computing environment by managing access of the uncorrelated account within the enterprise computing environment based on the response.

2. The system of claim 1, wherein determining a crowdsourcing target comprises: determining a second identity that is correlated with the peer correlated accounts and determining that the first identity that is related to the second identity.

3. The system of claim 2, wherein determining that the first identity that is related to the second identity is based on the identity management data.

4. The system of claim 1, wherein the first identity is associated with the source system associated with the peer correlated account.

5. The system of claim 1, wherein the source system includes a non-authoritative source system and an authoritative source system.

6. The system of claim 5, wherein the uncorrelated accounts are from the non-authoritative source system and the correlated are from the non-authoritative source systems, wherein each of the set of correlated accounts is associated with at least one of the identities from the authoritative source system.

7. The system of claim 1, wherein the similarity measure is determined between each uncorrelated account and each of the set of correlated accounts.

8. A method, comprising:
    obtaining identity management data associated with a source system in an enterprise computing environment, the identity management data comprising account data on accounts of the source system and identity data on identities of the enterprise computing environment;
    determining uncorrelated accounts of the accounts from the source system and correlated accounts from the accounts from the source system, wherein each of the correlated accounts is associated with an identity of the identities from the source system;
    determining a similarity measure based on an uncorrelated account of the set of uncorrelated accounts and the set of correlated accounts;
    clustering the accounts to determine account clusters, the clustering based on the similarity measure based on the uncorrelated account and the set of correlated accounts, wherein an account cluster of the account clusters comprises the uncorrelated account and one or more correlated accounts;
    managing network security of the distributed enterprise computing environment by:
    for the uncorrelated account of the uncorrelated accounts, determining the account cluster including the uncorrelated account;
    determining a peer correlated account in the account cluster, wherein the peer correlated account is one of the correlated accounts included in the account cluster;
    determining a crowdsourcing target based on the peer correlated account, wherein the crowdsourcing target is a first identity associated with the peer correlated account;
    sending a crowdsourcing communication associated with the uncorrelated account to the crowdsourcing target;
    determining a response to the crowdsourcing communication associated with the uncorrelated account; and
    managing network security of the enterprise computing environment by managing access of the uncorrelated account within the enterprise computing environment based on the response.

9. The method of claim 8, wherein determining a crowdsourcing target comprises: determining a second identity that is correlated with the peer correlated accounts and determining that the first identity that is related to the second identity.

10. The method of claim 9, wherein determining that the first identity that is related to the second identity is based on the identity management data.

11. The method of claim 8, wherein the first identity is associated with the source system associated with the peer correlated account.

12. The method of claim 8, wherein the source system includes a non-authoritative source system and an authoritative source system.

13. The method of claim 12, wherein the uncorrelated accounts are from the non-authoritative source system and the correlated are from the non-authoritative source systems, wherein each of the set of correlated accounts is associated with at least one of the identities from the authoritative source system.

14. The method of claim 8, wherein the similarity measure is determined between each uncorrelated account and each of the set of correlated accounts.

15. A non-transitory computer readable medium, comprising instructions for:
    obtaining identity management data associated with a source system in an enterprise computing environment, the identity management data comprising account data on accounts of the source system and identity data on identities of the enterprise computing environment;
    determining uncorrelated accounts of the accounts from the source system and correlated accounts from the accounts from the source system, wherein each of the correlated accounts is associated with an identity of the identities from the source system;
    determining a similarity measure based on an uncorrelated account of the set of uncorrelated accounts and the set of correlated accounts;
    clustering the accounts to determine account clusters, the clustering based on the similarity measure based on the uncorrelated account and the set of correlated accounts, wherein an account cluster of the account clusters comprises the uncorrelated account and one or more correlated accounts;
    managing network security of the distributed enterprise computing environment by:
    for the uncorrelated account of the uncorrelated accounts, determining the account cluster including the uncorrelated account;
    determining a peer correlated account in the account cluster, wherein the peer correlated account is one of the correlated accounts included in the account cluster;
    determining a crowdsourcing target based on the peer correlated account, wherein the crowdsourcing target is a first identity associated with the peer correlated account;
    sending a crowdsourcing communication associated with the uncorrelated account to the crowdsourcing target;
    determining a response to the crowdsourcing communication associated with the uncorrelated account; and
    managing network security of the enterprise computing environment by managing access of the uncorrelated account within the enterprise computing environment based on the response.

16. The non-transitory computer readable medium of claim 15, wherein determining a crowdsourcing target comprises: determining a second identity that is correlated with the peer correlated accounts and determining that the first identity that is related to the second identity.

17. The non-transitory computer readable medium of claim 16, wherein determining that the first identity that is related to the second identity is based on the identity management data.

18. The non-transitory computer readable medium of claim 15, wherein the first identity is associated with the source system associated with the peer correlated account.

19. The non-transitory computer readable medium of claim 15, wherein the source system includes a non-authoritative source system and an authoritative source system.

20. The non-transitory computer readable medium of claim 19, wherein the uncorrelated accounts are from the non-authoritative source system and the correlated are from the non-authoritative source systems, wherein each of the set of correlated accounts is associated with at least one of the identities from the authoritative source system.

21. The non-transitory computer readable medium of claim 15, wherein the similarity measure is determined between each uncorrelated account and each of the set of correlated accounts.

\* \* \* \* \*